US008515597B2

(12) United States Patent
McDowell et al.

(10) Patent No.: US 8,515,597 B2
(45) Date of Patent: Aug. 20, 2013

(54) MULTIPLE TRANSITION RNP APPROACH PROCEDURE

(75) Inventors: Andrew McDowell, Atlanta, GA (US); Jeffery Leon Bruce, Newnan, GA (US)

(73) Assignee: The Boeing Company, Chicago, IL (US)

( * ) Notice: Subject to any disclaimer, the term of this patent is extended or adjusted under 35 U.S.C. 154(b) by 643 days.

(21) Appl. No.: 12/651,687

(22) Filed: Jan. 4, 2010

(65) Prior Publication Data

US 2011/0144832 A1   Jun. 16, 2011

Related U.S. Application Data

(60) Provisional application No. 61/285,453, filed on Dec. 10, 2009, provisional application No. 61/285,831, filed on Dec. 11, 2009.

(51) Int. Cl.
*G01C 23/00* (2006.01)
*G01C 21/00* (2006.01)

(52) U.S. Cl.
USPC .............................................. 701/3; 701/467

(58) Field of Classification Search
USPC ........................ 701/3, 16, 200, 206
See application file for complete search history.

(56) References Cited

U.S. PATENT DOCUMENTS

| | | | |
|---|---|---|---|
| 6,195,609 B1* | 2/2001 | Pilley et al. | 701/120 |
| 6,438,469 B1* | 8/2002 | Dwyer et al. | 701/16 |
| 6,950,731 B1* | 9/2005 | English | 701/16 |
| 7,302,318 B2 | 11/2007 | Gerrity et al. | |
| 7,554,483 B2 | 6/2009 | Markiton et al. | |
| 7,693,621 B1* | 4/2010 | Chamas | 701/16 |
| 8,027,756 B2* | 9/2011 | Davis et al. | 701/8 |
| 8,073,578 B1* | 12/2011 | McCusker | 701/3 |
| 8,112,188 B2 | 2/2012 | Rouquette et al. | |
| 2008/0262665 A1* | 10/2008 | Coulmeau et al. | 701/16 |
| 2008/0294307 A1 | 11/2008 | Krough | |
| 2009/0043434 A1* | 2/2009 | Deker | 701/16 |
| 2012/0004837 A1* | 1/2012 | McDonald | 701/120 |

FOREIGN PATENT DOCUMENTS

| | | |
|---|---|---|
| EP | 1818891 A2 | 8/2007 |
| FR | 2915304 A1 | 10/2008 |
| FR | 2923614 A1 | 5/2009 |

OTHER PUBLICATIONS

United States Standard for Required Navigation Performance (RNP) Approach Procedures with Special Aircraft and Aircrew Authorization Required (SAAAR); U.S. Department of Transportation Federal Aviation Administration; Jun. 3, 2005; Order 8260.52; 64 pages.
Delta; ATL-RF leg Project—PARC WG Briefing; Jan. 2010; 49 pages.
Korn, B.; FAGI—Future Air Ground Integration; Oct. 12, 2009; 25 pages.
Jeppesen Terminal Chart; Aug. 16, 2009; 1 page.

(Continued)

*Primary Examiner* — James Trammell
*Assistant Examiner* — Majdi Alsomiri
(74) *Attorney, Agent, or Firm* — Armstrong Teasdale LLP

(57) ABSTRACT

A required navigation performance (RNP) approach method is described that includes providing a plurality of fixed, predetermined waypoints associated with at least one runway of at least one airport, providing a predetermined plurality of constant radius turnpoints connecting a downwind leg of the runway to a final approach leg of the runway, and assigning one of the constant radius turnpoints to an aircraft capable of flying an RNP approach, the turnpoint selected to provide separation from other approaching aircraft and a landing time for the aircraft.

11 Claims, 6 Drawing Sheets

(56) References Cited

OTHER PUBLICATIONS

Report prepared by the Performance-Based Operations Aviation Rulemaking Committee (PARC); Applications and Benefits of required Navigation Performance (RNP) for Large Airports with Surrounding Satellite Operations; Apr. 21, 2009; 15 pages.

Report prepared by the Performance-Based Operations Aviation Rulemaking Committee (PARC); Concepts and Benefits for Terminal RNP Procedures; Apr. 2009; 16 pages.

Alaska Airlines, Horizon Air Pursue "Greener Skies" over Seattle; http://spash.alaskaworld.com; Jul. 8, 2009; 3 pages.

European Search Report for Application No. 10193735.7-1232; Dec. 28, 2011; 9 pages.

Ferrante, J., et al; Human-in-the-Loop Simulation of Area Navigation Visual Flight Procedures at Atlanta International Airport; Digital Avionics Systems Conference; 2010 IEEE; pp. 4B.3-1 to 4.B.3-10.

DLR 4D-CARMA (4 Dimensional Cooperative Arrival Manager); modified Jul. 21, 2006; 1 sheet.

* cited by examiner

MULTIPLE TRANSITION RNP APPROACH PROCEDURE

CROSS REFERENCE TO RELATED APPLICATIONS

This application claims the benefit of Provisional Patent Application Ser. No. 61/285,453, filed Dec. 10, 2009 and Provisional Patent Application Ser. No. 61/285,831, filed Dec. 11, 2009, both of which are hereby incorporated by reference in their entirety.

BACKGROUND

This disclosure relates generally to required navigation performance (RNP) procedures, and more particularly to methods, apparatus, and design systems for aircraft traffic control based on required navigation performance standards and metrics.

Performance-based aircraft applications include area navigation (RNAV) and required navigation performance (RNP) systems and metrics. These systems and metrics define certain performance levels, performance, functionality, and capability as agreed-upon standards. The aviation community has been broadly adopting RNAV and RNP. The FAA is implementing RNAV and RNP for operations conducted under instrument flight rules (IFR), but RNAV and RNP are not being required under visual flight rules (VFR).

"RNAV", as used herein, refers to a method of navigation that enables aircraft to fly on any desired flight path within the coverage of referenced navigation aids (NAVAIDS), Global Positioning System (GPS) or within the limits of the capability of self-contained systems, or a combination of these capabilities. Routes and procedures using RNAV provide improved access and flexibility through point-to-point navigation and are not restricted to the location of ground-based NAVAIDS. The targeted level of safety is achieved via combined use of aircraft navigation accuracy, radar monitoring, automatic dependent surveillance (ADS) and/or additional separation buffers. Examples of systems used for RNAV operations today are flight management systems (FMS) and panel-mount IFR global positioning system (GPS).

"RNP," as used herein, refers to operations with navigation containment and monitoring. An RNP system allows an aircraft navigation system to monitor its achieved navigation performance and to identify whether the operational requirement is not being met during an operation. RNP capability of an aircraft is a major component in determining the separation criteria to ensure that the target levels of safety are met. For example, when flying an RNP procedure an airplane must be qualified and capable of flying with an actual navigation precision equal to or greater than the required navigation performance prescribed by the procedure.

Aircraft using RNP procedures are required to turn or guide themselves accurately on a procedure. RNP procedures are now mandatory for certain difficult to navigate to, terrain challenged, airports, such as those in Tibet, in very high-altitude mountainous areas in South America, and some in Alaska. Certain of these airports have no straight-in approaches, but only approaches with mountainous terrain on both sides and therefore some turns are required in these approaches. RNP is well known for providing precision approaches in such areas. However, aircraft manufacturers and operators would like to use RNP to enable pilots to fly aircraft more efficiently when approaching other airports. For example, by merely applying the same approach, speed, and decent rate to every given aircraft, which is one current non-RNP approach, a pilot cannot operate an aircraft nearly as efficiently. Nevertheless, acceptance of RNP procedures is not being achieved at high congestion airports, because air traffic controllers (ATCs) cannot easily combine airplanes flying customized RNP approaches with air traffic unable to conduct a RNP approach. Since the ATCs primary concern is keeping two aircraft from being in the same location at the same time rather than the efficiency of the approach for any particular aircraft, the RNP procedures are not being accepted. As a result, many aircraft are not operating with peak efficiency due to constraints applied by ATCs.

While known RNP procedures could provide improved efficiency for aircraft capable of flying RNP approaches, they are not used by ATC since a faster aircraft could potentially overtake a slower aircraft flying in the same traffic pattern. Thus, current RNP approaches do not integrate well with the type of traffic patterns and separation requirements that local ATCs prefer, and the potential savings in fuel, operations and emissions are therefore not realized.

It would therefore be desirable to provide methods, apparatus, and design systems that achieve separation requirements for aircraft in a high volume terminal airspace situation as well as reduce the amount of workload on the air traffic control workforce to direct traffic safely to a runway end. A precision procedure that would meet with acceptance by local ATCs would also be desirable.

BRIEF DESCRIPTION

In one aspect, some described embodiments provide a required navigation performance (RNP) approach method that includes providing a plurality of fixed, predetermined waypoints for association with at least one runway of at least one airport, providing a predetermined plurality of constant radius turnpoints connecting a downwind leg of the runway to a final approach leg of the runway, and assigning one of the constant radius turnpoints to an aircraft capable of flying an RNP approach, the turnpoint selected to provide separation from other approaching aircraft and a landing time for the aircraft.

In another aspect, some described embodiments provide a navigational system for an aircraft. The navigational system includes a processing device, a memory associated with the computer, and a control system operative through the computer and the memory. The control system is configured with RNP procedures, wherein the RNP procedures include a fixed plurality of predetermined RNP transition points stored in the memory. The RNP transition points define where the aircraft can be controlled to enter an airport runway approach at an assigned speed.

In yet another aspect, some embodiments provide a method for controlling airport traffic. The airport traffic includes both aircraft flying in RNP mode and aircraft not flying in RNP mode. The method includes, for aircraft flying in RNP mode, routing an aircraft flying in RNP mode from a waypoint to a downwind leg of a runway approach. The method also includes determining, using sequencing and separation requirements, one of a fixed plurality of predetermined RNP transition points for the runway approach and a speed of approach. The method also includes routing the aircraft flying in RNP mode using the determined RNP transition point and speed of approach so that the aircraft flying in RNP mode can approach the runway and maintain its separation and sequencing relative to other aircraft approaching the runway. The method further includes, for aircraft not flying in RNP mode, routing an aircraft not flying in RNP mode from a waypoint to a downwind leg of a runway approach. The method also includes determining, using sequencing and separation requirements, one of the fixed plurality of predetermined RNP transition points and speed of approach for the runway approach, and routing the aircraft not flying in RNP mode to the determined RNP transition point for a turn to the runway approach. The method further includes monitoring the speed and direction of approach of the non-RNP-enabled aircraft to maintain its separation and sequencing relative to other aircraft approaching the runway.

In yet another aspect, some embodiments described herein provide an air traffic control system that has a processing device, a memory, and an interface for communicating with aircraft. The system is programmed with a plurality of geographical points that define, with respect to a runway, a downwind approach path, a final approach path, and a plurality of constant radius paths connecting the downwind approach path to the final approach path. The system is also programmed to define an approach path for an approaching aircraft by selecting one of the constant radius paths for the aircraft to fly, and to assign a speed for the aircraft to maintain at various points along the defined approach path. The defined approach path and assigned speed are calculated to maintain a separation between other aircraft flying defined approach paths, at assigned speeds, that include one of the constant radius paths.

Thus, it will be appreciated that the described embodiments allow aircraft flying RNP procedures to fit in with the traffic pattern at a high density, high use airport. Such embodiments make it easier for ATCs to accept, and are compatible with other traffic that controllers are trying to flow into the airport. By allowing for modified RNP approaches that can accommodate other traffic, RNP procedures could become more acceptable to air traffic controllers in major metropolitan areas than current procedures. Normal traffic flows could be kept, yet those airplanes flying the RNP approach can fly more efficiently and predictably than airplanes using an ATC customized approach via RADAR vectors.

Figure 1:
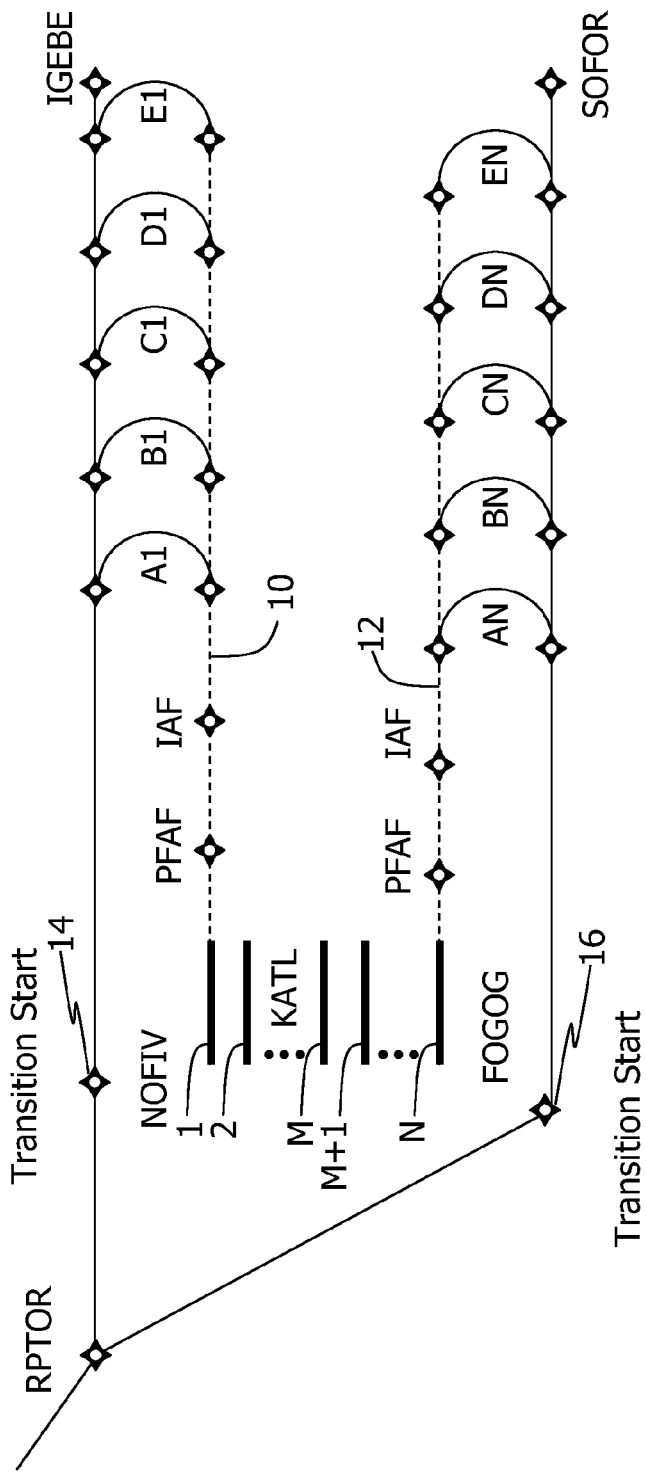
FIG. 1 is a schematic illustration of an airport runway system, showing runways, waypoints, flight paths, and turning points of one described embodiment.

The foregoing summary, as well as the following detailed description of certain embodiments, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

DETAILED DESCRIPTION

As used herein, an element or step recited in the singular and proceeded with the word "a" or "an" should be understood as not excluding plural said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Some embodiments combine an RNP approach route with a standard two-dimensional horizontal traffic pattern. However, these embodiments also add multiple turn points to an approach pattern which have the effect of maintaining horizontal separation between aircraft in the approach pattern while also enabling RNP benefits for aircraft flying the RNP approach. Aircraft having different arrival speeds can be accommodated within the same generalized horizontal pattern utilizing different turn (and possibly entry) points, while flying optimal or nearly optimal speeds and descents to an efficient final approach. This ability for a descent gradient from the common 'feeder waypoint' eliminates the need for a "dive and drive" approach commonly used in RADAR downwind approaches. Thus, technical effects of embodiments include increased aircraft efficiency and simplification of traffic control at high traffic airports.

Referring to the example of FIG. 1, an RNP path 10 or 12 is like a tube in space. If the path of the tube to the runway ends appropriately, then an ATC need only be concerned that the aircraft enters the tube at one end. Specifically, if the tube is traversed at a consistent speed, and the aircraft properly flies within the "tube", the ATC will know where and at what time the aircraft will exit the tube. As a result, and by design, the ATC can experience a reduced workload, because he/she knows the plane is in the tube and is flying a certain speed. Thus, he/she can shift most of his/her concentration off that plane and onto an aircraft not yet within the tube. The only issues that are of concern are where the tube ends and whether the airplane is sequenced properly for the queue line for the runway end. In the embodiment of FIG. 1, tubes can be thought of as starting in the vicinity of RPTOR, extending through one of the constant radius turn paths, and down the final approach leg, for example, ending at IAF.

The example configuration of FIG. 1 mimics a VFR traffic pattern for the airport, but allows an ATC to pick a constant radius transition A1, B2, . . . , DN, EN that he/she wants the aircraft to enter, so that the aircraft will come out of the corresponding tube and be able to proceed onto the runway at a specific time, thereby allowing the aircraft to enter the runway queue properly. All of the transitions for a given "tube" in this configuration have a core common ground path (e.g., "transition start" 14 or 16) at the beginning. All aircraft enter a given tube at the same geographical spot (e.g., waypoint RPTOR, waypoint NOFIV 14 or waypoint FOGOG 16), but the ATC will tell the flight crew which constant radius transition leg ("trombone end") they want to be flown by naming the end transition (sometimes referred to as a transition leg) (e.g., A1, B1, C1, D1, or E1 for waypoint NOFIV 14). Depending upon which transition leg the controllers have assigned, the aircraft is going to turn towards the centerline of the runway (e.g., centerline 10) and fly the constant radius route until reaching the final approach leg.

Once a constant radius transition leg is assigned and the aircraft goes into the end of the tube, as long as that aircraft is flying at the assigned speed, the pilot and ATC both know where the plane is going to end up, and at what time, and that the plane will be properly sequenced with the other traffic coming onto that runway. While all transitions have the same starting point (transition points 14 and 16 in FIG. 1 or the point designated as RPTOR), the various transition legs are set at different positions, resulting in different length approach routes, depending upon what the controller or an air traffic control system needs to do regarding the aircraft. Observe that this same pattern can be used for an arbitrary number of runways 1, 2, . . . , M, M+1, . . . , N, wherein each pattern can have the same or a different number of transitions (i.e., there need not be five transitions A-E for each runway, but each runway can have any number of predetermined, fixed transitions, and the number for each runway can, in general, be different). (Note: PFAF=Precision final approach fix. IAF=Initial approach fix. RPTOR, NOFIV, FOGOG, SOFOR, and IGEBE are waypoints. The example is intended to mimic Atlanta Hartsfield-Jackson International Airport).

The benefits of RNP extend another technology known as area navigation (RNAV). RNAV technology enables flying from one point above the ground to another point above the ground and those points can be anywhere on earth. For example, in FIG. 1 the line from RPTOR to IGEBE is called the downwind leg. Currently, an aircraft coming from the NW into Atlanta will fly to RPTOR and then turn into the downwind leg heading for IGEBE. The aircraft will stay at a constant altitude until the pilot is instructed by ATC to turn 90° south. The ATC can make this request anywhere along the RPTOR-IGEBE line. The controller will request the turn where he/she finds a space in traffic along runway approach tube 10. All the aircraft in that tube is lined up in a row heading for the runway end. The ATC controllers will give the aircraft a vector to turn 90° south, towards approach tube 10. As the airplane gets closer to approach tube 10, the ATC will call the pilot to turn on and head runway heading. The airplane will turn another 90° to turn onto approach tube 10. ATC thus gives instructions manually and keeps a constant watch on that and all the other aircraft in the approach and landing pattern. Such an effort puts a workload burden on the controller.

With some configurations of the presently described embodiments, predetermined turn points are provided, some of which are starting points for the above mentioned constant radius transition legs (or paths). So in one embodiment, before the aircraft gets to RPTOR, the ATC will tell the aircraft to take the RNP procedure to the northernmost runway and use transition C1. In another embodiment, a control system assigns the constant radius transition path. The flight crew will have the onboard flight management system pull up transition C1 and load it in the autopilot so that the autopilot will fly the aircraft along a path, take turn C1, and come around. (In some embodiments, the flight crew may fly this path and take turn C1 manually.) ATC will say what speed to travel that line or path, so that when the aircraft comes out of turn C1, it is sequenced properly with the other aircraft on final approach 10.

With RNP, an ability to describe the procedure prior to arrival at RPTOR, for example, is provided. Once the controller clears the zone and sees that the aircraft is approaching RPTOR, and is on the RNP procedure, ATC does not have to worry about that aircraft anymore. ATC still has to monitor that the aircraft speed is the same as requested by ATC. Once the ATC has confirmed this speed, they do not have to address that aircraft anymore until he/she tells the aircraft to turn over to the tower frequency and get clearance to land. Thus, ATC will be able to concentrate on other aircraft coming down towards RPTOR and the airport to get them lined up to hit the tube appropriately, and on which constant radius transition leg he/she wants to put the other aircraft on for the approach sequencing. It should be noted that transition legs without a constant radius are contemplated, as long as the distance between the start of the transition and the end of the transition is known, but it is believed the constant radius transition provides the most efficient flight path.

In addition, the ATC could guide an airplane not flying in RNP mode down these same paths, including one of the constant radius transitions paths, but it would have to be monitored. The described embodiments not only help the ATC with aircraft operating in RNP mode, but also with aircraft not operating in RNP mode. For example, in the case of a Lear jet that is flying faster than a 737, the Lear jet could come in at NOFIV and take the E1 turn because that would sequence the Lear jet at the appropriate time, when another aircraft may come in, say, with the A1 turn. Or, if a Lear jet arrives that is not RNP capable, ATC could send the Lear jet down to E1 or the very end of the line, and those aircraft that are RNP-capable could take an earlier turn. As much as this procedure helps the RNP mode planes, it also facilitates traffic management with respect to non-RNP mode planes. These system embodiments provide benefits for RNP mode aircraft and also facilitate all sorts of traffic into the airport by using a known timing between the various turnpoints.

The RNP systems and methods described herein may be deployed, in part, on the flight management system of the aircraft. In such embodiments, the aircraft is certified to fly RNP down to a certain level of accuracy, which is typically measured in nautical miles. For example, a Boeing 737 can achieve 0.10 NM width 95% of the time, so the aircraft will stay within that 0.1 NM of its desired path.

The use of RNP allows a pilot to fly an aircraft more efficiently and save on fuel. Doing a constant radius turn using RNP is far more efficient than having the airplane stay fixed at one altitude, turn left 90°, level off, turn left 90°, level off again, and turn down the approach.

Figure 2:
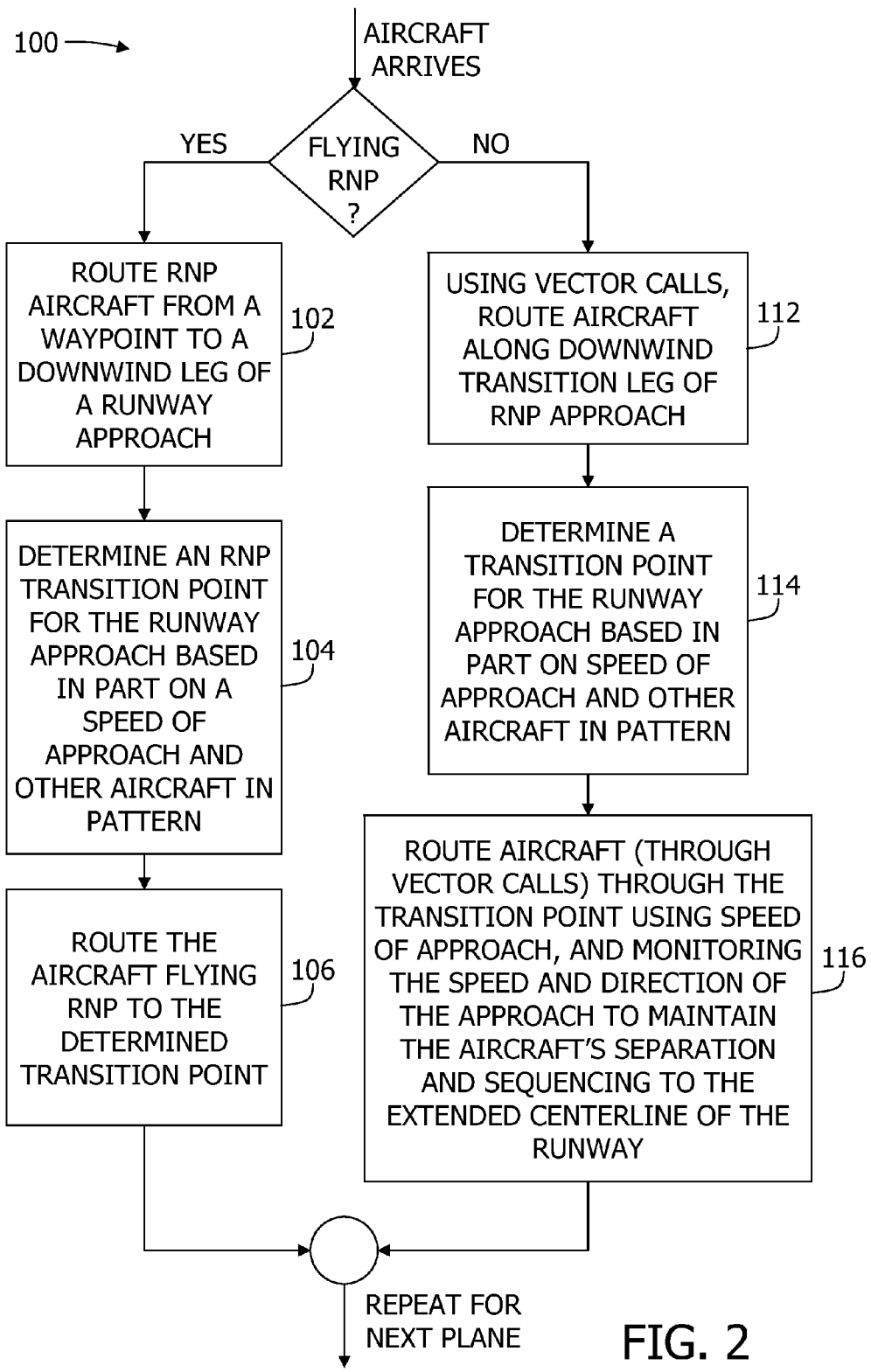
FIG. 2 is a flowchart of a method embodiment for controlling airport traffic that includes both aircraft using RNP mode and aircraft not using RNP mode.

Thus, more specifically, and in one embodiment, a method for controlling airport traffic that includes both aircraft flying in RNP mode and aircraft not flying in RNP mode aircraft is provided. Referring to flow chart of FIG. 2, method 100 includes, for aircraft flying in RNP mode: at block 102, routing an aircraft flying an RNP procedure from a waypoint (e.g., RPTOR) to a downwind leg (starting at 14) of a runway approach (e.g., runway 1 approach). The method further includes determining at block 104, using sequencing and separation requirements, one of a fixed plurality of predetermined RNP transition points (e.g., C1) for the runway approach and a speed of approach, and at block 106, routing the aircraft flying the RNP procedure using the determined one of the RNP transition points with a speed of approach so that the aircraft flying the RNP procedure can use an autopilot to approach the runway. (Manual control may be used instead of autopilot in some configurations).

The method further includes, for aircraft not flying an RNP approach routing using vector calls, at block 112, an aircraft not flying an RNP approach from a waypoint along a downwind transition leg of a RNP runway approach, determining at block 114, using sequencing and separation requirements, one of the fixed plurality of predetermined RNP transition points based on a speed of approach for the runway approach and other aircraft in pattern, and routing, at block 116, the aircraft not flying an RNP approach through the determined RNP transition point, through vector calls, using speed of approach, and monitoring the speed and direction of approach, to maintain the aircraft's separation and sequencing relative to the extended centerline of the runway.

In some embodiments, a plurality of aircraft including both aircraft flying an RNP approach and aircraft not flying an RNP approach are stacked on the runway approach. Also in some embodiments, the aircraft not flying an RNP approach are RNAV-enabled aircraft. Inclusion of the RNP procedure waypoints on the ATC RADAR video map will aid the controller in adjustments for the aircraft not using RNP.

Figure 3:
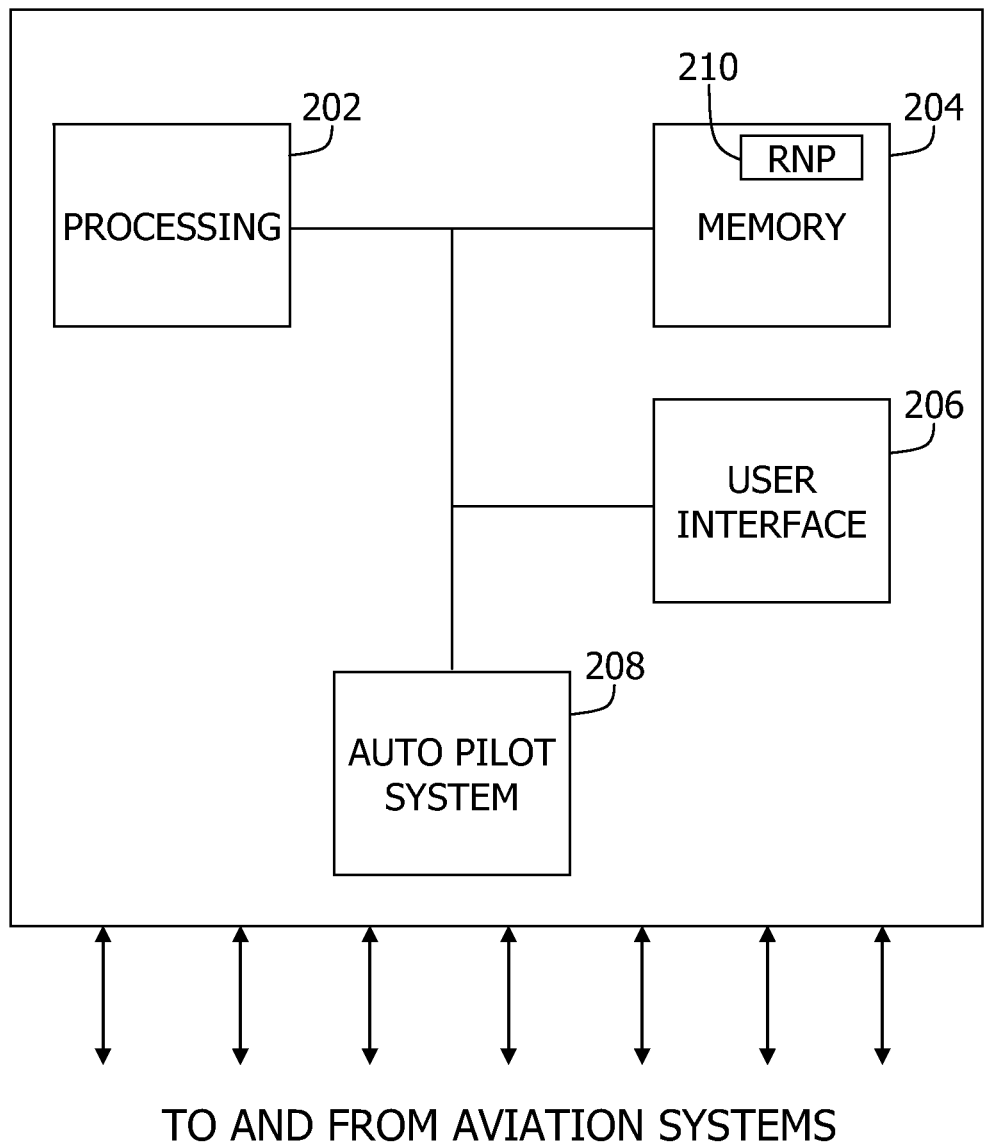
FIG. 3 is a block schematic diagram of a navigational control system embodiment for an aircraft.

In yet another embodiment and referring to FIG. 3, there is provided a navigational control system 200 for utilization within an aircraft comprising a processing device 202, memory 204, a user input subsystem 206, and an autopilot system 208. The navigational control system further includes RNP procedure modules 210 stored within the memory 204, wherein the RNP procedures include a fixed plurality of predetermined RNP transition points, such as those shown in FIG. 1, at which the aircraft can be controlled to enter an airport runway approach at an assigned speed. In some embodiments, RNP procedures modules 210 are configured to maintain an accuracy of not more than 0.10 NM variance about a predetermined path.

Figure 4:
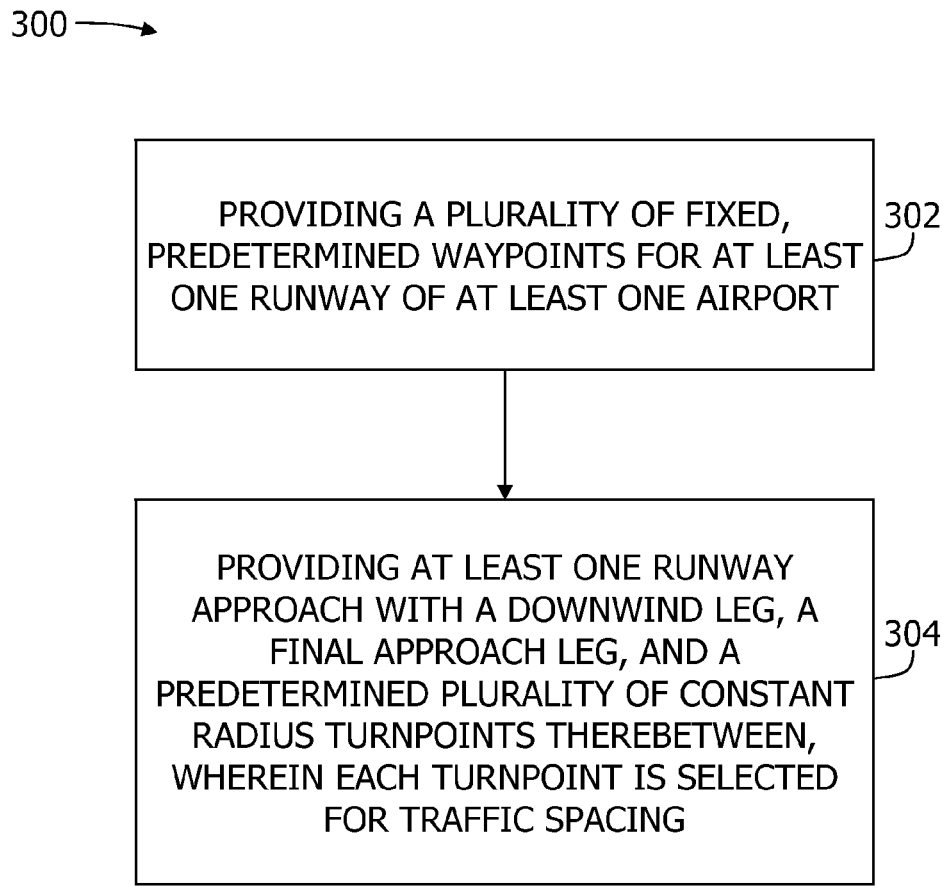
FIG. 4 is a flow chart of a method embodiment for designing an RNP procedure.

In still another embodiment and referring to flow chart 300 of FIG. 4, a method for designing an RNP procedure includes, at block 302, providing a plurality of predetermined waypoints for at least one runway of at least one airport, and, at block 304, providing at least one RNP runway approach with a downwind leg, a final approach leg, and a predetermined plurality of constant radius turnpoints, extending from the downwind leg to the final approach leg, wherein each turnpoint is selected for traffic spacing.

Figure 5:
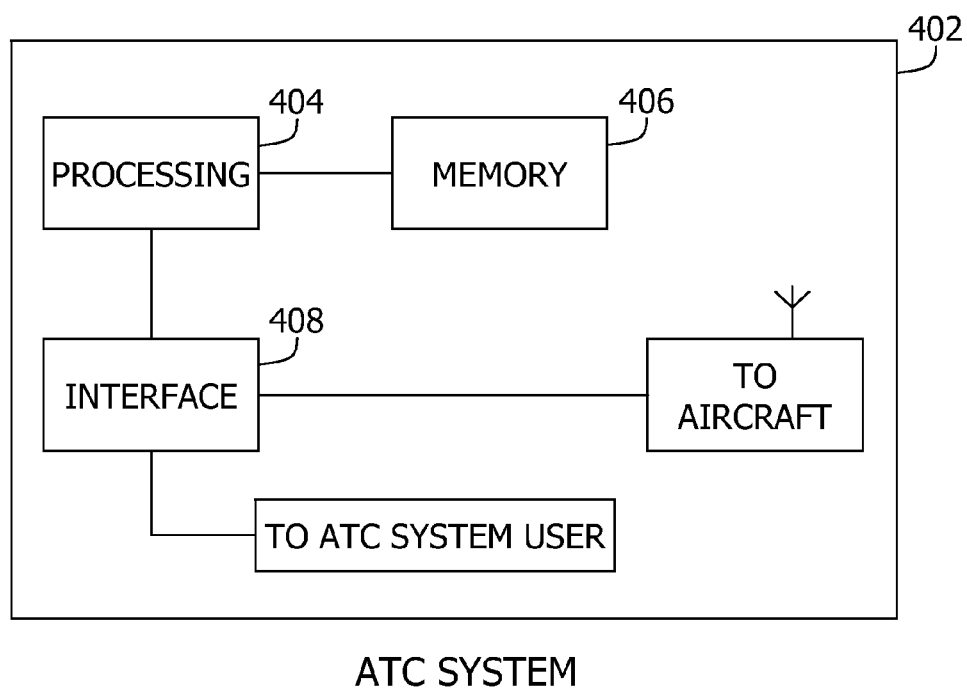
FIG. 5 is a block diagram of an air traffic control system.

In yet another embodiment and referring to schematic block diagram 400 of FIG. 5, an air traffic control system 402 includes a processing device 404, a memory 406, and an interface 408 for communicating with aircraft. System 402 is programmed with a plurality of geographical points (e.g., waypoints) that define, with respect to a runway, a downwind approach path, a final approach path, and a plurality of constant radius paths connecting the downwind approach path to the final approach path. These waypoints may be provided to a flight management system of the aircraft by the ATC system 402 while the flight management system provides updates as to its position to the ATC system 402.

Figure 6:
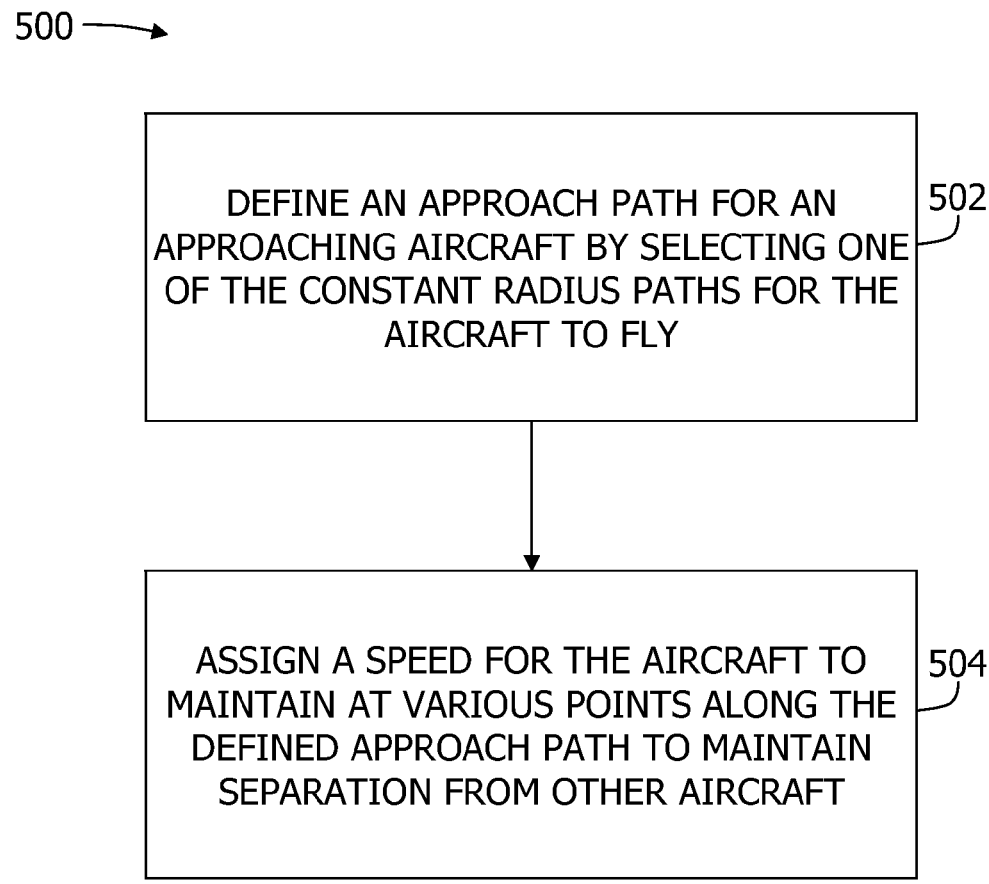
FIG. 6 is a flow chart for defining an aircraft approach path.

Referring to flow chart 500 of FIG. 6, system 402 is also programmed to define, at 502, an approach path for an approaching aircraft by selecting one of the constant radius paths for the aircraft to fly, and, at 504, assign a speed for the aircraft to maintain at various points along the defined approach path. The defined approach path and assigned speed are calculated to maintain a separation between other aircraft flying defined approach paths, at assigned speeds, that include one of the constant radius paths.

In some embodiments, ATC system 402 is programmed to, based on the assigned speeds, determine a time the aircraft will be at each geographical point of the approach path. Also in some embodiments, defining an approach path includes communicating a ground path to the aircraft. In some embodiments, ATC system 402 is programmed to assign one of the constant radius paths to an aircraft to provide a known timing between the aircraft and other aircraft flying the final approach path.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for controlling airport traffic that includes both aircraft flying in RNP mode and aircraft not flying in RNP mode, the method being implemented by an air traffic control system including a processing device, the method comprising:

routing, by the air traffic control system, a plurality of aircraft including routing a first aircraft flying in RNP mode from a waypoint to a downwind leg of a runway approach and routing a second aircraft not flying in RNP mode from the waypoint to the downwind leg of the runway approach;

determining, by the air traffic control system, using sequencing and separation requirements, a first one of a fixed plurality of predetermined RNP transition points for the first aircraft to fly to, a second one of the fixed plurality of predetermined RNP transition points for the second aircraft to fly to, and an associated speed of approach for the second aircraft when the first aircraft and the second aircraft are moving from the downwind leg to a final approach leg;

routing, by the air traffic control system, the first aircraft using the first determined RNP transition point and a speed of approach of the first aircraft so that the first aircraft can approach the runway and maintain separation and sequencing of the first aircraft relative to other aircraft of the plurality of aircraft approaching the runway;

routing, by the air traffic control system, the second aircraft to the second determined RNP transition point for a turn to the runway approach; and monitoring, by the air traffic control system, the speed of approach and a direction of approach of the second aircraft to maintain separation and sequencing of the second aircraft relative to the other aircraft of the plurality of aircraft approaching the runway.

2. A method in accordance with claim 1 wherein the first aircraft and the second aircraft are stacked on the runway approach.

3. A method in accordance with claim 1 wherein the second aircraft is an RNAV-enabled aircraft.

4. A method in accordance with claim 1 wherein determining a first one of a fixed plurality of predetermined RNP transition points for the first aircraft to fly to comprises selecting one of the predetermined RNP transition points based in part on a speed of the first aircraft.

5. A method in accordance with claim 1 wherein the fixed plurality of predetermined RNP transition points includes a plurality of constant radius turnpoints each having a location selected for traffic spacing.

6. A method in accordance with claim 1 further comprising storing the fixed plurality of predetermined RNP transition points within a flight management system of the first aircraft.

7. A method in accordance with claim 1 further comprising transmitting the fixed plurality of predetermined RNP transition points from an air traffic control system to aircraft.

8. An air traffic control (ATC) system comprising:
a processing device;

a memory; and an interface for communicating with aircraft, said system programmed with a plurality of geographical points that define, with respect to a runway, a downwind approach path, a final approach path, and a plurality of constant radius paths connecting the downwind approach path to the final approach path, said system further programmed to:

define a first approach path for a first approaching aircraft flying in RNP mode and define a second approach path for a second approaching aircraft not flying in RNP mode by selecting, for each of the first aircraft and second aircraft, one of the constant radius paths for each of the first aircraft and second aircraft to fly;

assign a first speed for the first aircraft to maintain at various points along the first defined approach path, the first defined approach path and first assigned speed calculated to maintain a separation between other aircraft flying defined approach paths, at assigned speeds, that include one of the constant radius paths; and monitor a second speed and a direction of approach of the second aircraft to maintain separation and sequencing of the second aircraft relative to the other aircraft flying defined approach paths.

9. An ATC system according to claim 8 wherein said system is programmed to, based on the assigned speeds, determine a time the first aircraft will be at each geographical point of the first approach path.

10. An ATC system according to claim 8 wherein defining the first approach path comprises communicating a ground path to the first aircraft.

11. An ATC system according to claim 8 wherein said system is programmed to assign one of the constant radius paths to an aircraft to provide a known timing between the aircraft and other aircraft flying the final approach path.

* * * * *